Figure 1:
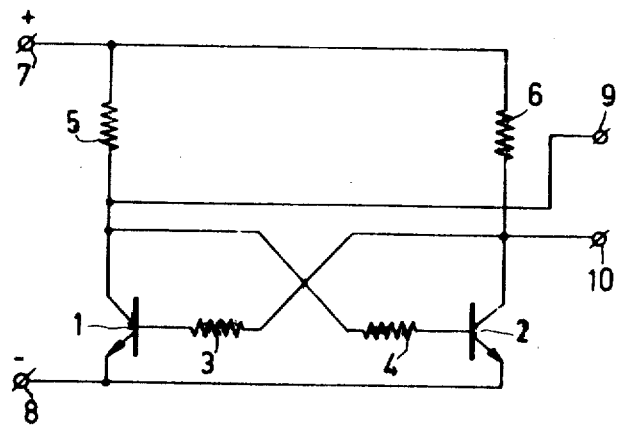

United States Patent

[11] 3,593,101

[72] Inventor: Derk Jan Chris Wassink
 Emmasingel, Eindhoven, Netherlands
[21] Appl. No.: 757,572
[22] Filed: Sept. 5, 1968
[45] Patented: July 13, 1971
[73] Assignee: U.S. Philips Corporation
 New York, N.Y.
[32] Priority: Sept. 8, 1967
[33] Netherlands
[31] 6712329

[54] ARRANGEMENT FOR CONNECTING AN ELECTRIC BATTERY TO A SOURCE OF CHARGING CURRENT
9 Claims, 3 Drawing Figs.

[52] U.S. Cl. .............................................. 320/25,
 307/288, 307/291, 328/206
[51] Int. Cl. .............................................. H01m 45/04,
 H02j 7/00

[50] Field of Search ......................................... 307/291,
 288, 238; 320/1, 25, 26; 328/66, 67, 206

[56] References Cited
UNITED STATES PATENTS
3,010,031 11/1961 Baker ........................... 307/291 X
3,483,530 12/1969 Furman et al. ................. 307/291 X Primary Examiner—Donald D. Forrer
Assistant Examiner—John Zazworsky
Attorney—Frank R. Trifari ABSTRACT: A switching device for interconnecting an electric battery with a DC source of charge current includes a bistable trigger circuit having input terminals connected to the current source and output terminals for connection to a battery to be charged. The trigger circuit is controlled by the battery polarity so that it always assumes the proper state for charging the battery for either of the two possible battery connections.

INVENTOR.
DERK J.C. WASSINK 3,593,101

ARRANGEMENT FOR CONNECTING AN ELECTRIC BATTERY TO A SOURCE OF CHARGING CURRENT

The present invention concerns apparatus for charging an electric battery, and more particularly to a switching device that protects the battery in the event that it is inadvertently connected to the voltage source with the wrong polarity.

When an electric battery is to be charged it is connected to a source of direct voltage which may be filtered, which source has to supply a charging current. It must always be ensured that the connection is correct because a connection of wrong polarity may give rise to destruction of the battery as a result of a complete discharge thereof at increased current intensity followed by a charging of wrong polarity.

There is always a risk of wrong connection even for those skilled in the art, for example, due to carelessness, but this risk is particularly large with the small and miniature batteries used nowadays, for example, in hearing aids.

An object of the invention is to provide a very simple arrangement for connecting an electric battery to a source of charging current, so as to avoid this risk.

The arrangement in accordance with the invention is characterized in that it is constituted by a symmetrical bistable trigger circuit comprising two semiconductor amplifier elements, the output and control electrodes of which are coupled crosswise with each other through coupling resistors. The output electrodes are connected to a first input terminal through load impedances and the common electrodes are connected to a second input terminal for connecting a charging current source having a forward polarity with respect to the common electrodes, and the respective junctions of the coupling resistors and load impedances are connected to two output terminals for connecting the battery.

The invention is based on recognition of the fact that with such an arrangement, when a battery is wrongly connected, taking into account the prevailing stable state of the trigger circuit, the trigger circuit triggers to its other stable state so that the battery is ultimately correctly connected.

The semiconductor elements are preferably junction transistors, for example, of the NPN-conductivity type.

The invention will be described more fully with reference to the drawing, which shows in FIGS. 1—3, circuit diagrams of three embodiments of the arrangement in accordance with the invention.

The arrangement shown diagrammatically in FIG. 1 is constituted by a symmetrical bistable trigger circuit comprising two semiconductor amplifier elements in the form of junction transistors 1 and 2 of the NPN-conductivity type, the transistor output and control electrodes, in the present case the collector and base electrodes, are coupled crosswise with each other through coupling resistors 3 and 4, at the same time, the output or collector electrodes are connected through load resistors 5 and 6 to a first input terminal 7 and the common or emitter electrodes are connected to a second input terminal 8 terminals 7 and 8 are connected to a charging current source, not shown having a positive polarity with respect to the common or emitter electrodes. The various junctions of the coupling and load resistors 3 and 6 and 4 and 5, respectively, are connected to two output terminals 9 and 10 for connecting a battery to be charged.

Let it be assumed that after a charging current source of the indicated polarity has been connected to the input terminals 7 and 8, the arrangement is in the stable state in which the transistor 1 is strongly conducting or saturated and the transistor 2 is cut off or substantially completely cut off. When the output terminal 9 is connected to the positive terminal and the output terminal 10 to the negative terminal of a battery to be charged, this battery is further discharged through the collector-emitter path of the transistor 1, the charging current source and the load resistor 6 of the transistor 2. As a result, however, the voltage drop across the resistor 6 becomes so large (larger than that across the load resistor 5 of the saturated transistor 1 plus the residual voltage $V_{no}$ of the battery to be discharged) that the transistor 1 is cut off by reverse biasing of its base through the coupling resistor 3, as a result, the transistor 2 becomes conducting and is saturated. The battery is now charged through the load resistor 5 and the collector-emitter path of the saturated transistor 2 by means of the charging current source connected to the input terminals 7 and 8.

The charging voltage applied to the battery to be charged through the load resistor 5 (or 6) is equal to the voltage $V_L$ of the charging current source connected to the terminals 7, 8 minus the saturation or knee voltage $V_k$ of the transistor 2 (or 1) and the charging current $I_L$ is substantially equal to the voltage difference between $V_L$ and $V_k$ minus the voltage $V_n$ of the battery and divided by the value $R_b$ of the load resistor 5 (or 6). The resistors 5 and 6 consequently have to be proportioned in accordance with the desired charging current. The resistors 3 and 4 on the other hand should be chosen so small that with the maximum charging current through one of the transistors, for example, transistor 2, this transistor remains saturated despite the voltage drop produced across the load resistor (for example, 5) of the other transistor by the charging current flowing through this resistor.

The arrangement described is preferably incorporated or included in a charging aggregate because a wrong connection of this aggregate to its input terminals 7 and 8 is then also impossible. However, it may also be manufactured or employed separately. It has the disadvantage that, when no charging current source or a charging current source of unduly low voltage is connected to the terminals 7 and 8, a battery having a comparatively large electromotive force included between the terminals 9 and 10 is discharged through the series-combination of the load resistors 5 and 6. Therefore, it is absolutely unsuitable to be combined with a battery or an apparatus including such a battery which could sometimes be desirable.

Figure 2:
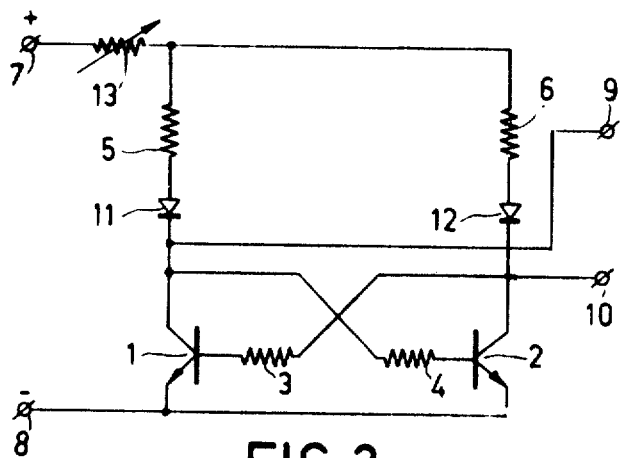

In the embodiment shown in FIG. 2, this disadvantage is avoided by the use of two diodes 11 and 12 connected in series with the load resistors 5 and 6; in the absence of a current source between the terminals 7 and 8 or when the electromotive force of a battery connected between the terminals 9 and 10 is larger than the voltage of a charging current source operative between the terminals 7 and 8, one of the diodes 11 and 12 is always cut off so that the battery cannot possibly be discharged through the circuit 11, 5, 6, 12.

Further diodes (not shown) could be connected between the collector of each of the transistors 1 and 2 and the corresponding output terminal 9 and 10, respectively, in order to prevent the battery from being discharged, in the absence of a charging current source, via the collector-base leakage current path of one of these transistors. This leakage current is so small, however, that such diodes usually are superfluous.

The embodiment of FIG. 2 further includes an adjustable resistor 13 connected between one of the input terminals 7 and 8 and the corresponding point of the trigger circuit constituted in this case by the junction of the load resistors 5 and 6. By means of this resistor 13, the arrangement can be adapted to the voltage of the charging current source available and/or to the nominal voltage of the battery to be charged and the charging current can be adjusted to a given value.

When a battery of considerable capacity is to be charged, the embodiments described have the disadvantage that a large part of the energy supplied by the charging current source connected to the terminals 7, 8 is dissipated in the resistors 5 and 6 and 5, 6 and 13, respectively.

Figure 3:
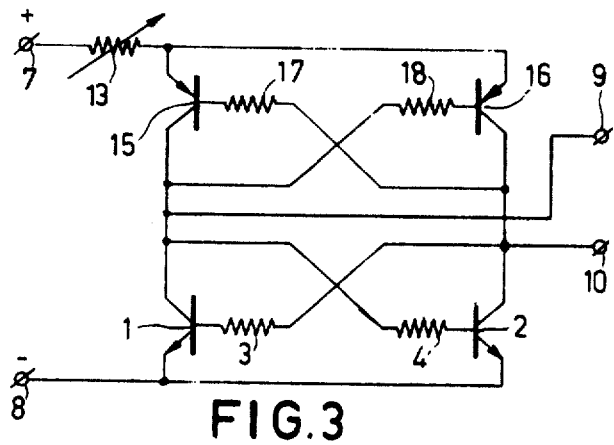

In the embodiment shown in FIG. 3, this disadvantage is at least substantially completely avoided in that the resistors 5 and 6 have been replaced by the main current electrode paths i.e. the emitter-collector paths, of transistors 15 and 16 of a conductivity type opposite to that of transistors 1 and 2. The bases of these transistors and their collectors are also coupled crosswise with each other through resistors 17 and 18 so that the transistors 15 and 16 are also included in a bistable trigger circuit, the transistor 16 being conducting simultaneously with transistor 1 and the transistor 15 conducts simultaneously with transistor 2.

When a battery is connected to the terminals 9 and 10 with a polarity such that, for example, the terminal 9 is positive with respect to the terminal 10, the transistors 1 and 16 are cut off and the transistors 2 and 15 become conducting so that the battery is charged through the emitter-collector paths of these two transistors and the resistor 13.

If the resistance value of resistor 13 plus the natural resistance of the charging current source should be equal to zero or be negligibly small, the charging current $I_L$ would approximately be equal to the voltage $V_a$ of the battery multiplied by the smallest of the quotients:

$(a'2/R_4)$ and $(a'15/R_{17})$ or $(a'1/R_3)$ and $(a'16,/R_{18})$ so that it would increase proportionally with the battery voltage $V_a$. This is generally undesirable and can be avoided by choosing the values of the resistors 3, 4, 17 and 18 so small that the conducting transistors 2 and 15 or 1 and 16 are normally saturated. The charging current $I_L$ is then mainly determined by the sum $R_{13+}$ of the resistance value of the adjustable resistor 13 and of the natural resistance of the charging current source.

$I_L = V_L - (V_K + V'_k) - V_a/R_{13+}$ where $V_k$ and $V'_k$ represent the knee voltages of the transistor 1 or 2 and of the transistor 16 or 15.

These are two extreme cases and by a suitable proportioning of the base resistors 3, 4, 17 and 18 it may be achieved that the charging current is substantially completely independent of the battery voltage $V_a$ provided that this voltage is sufficiently large to set the bistable trigger circuit comprising the transistors 1 and 2 and, in the third embodiment, also the bistable trigger circuit comprising the transistors 15 and 16, to the required stable state.

In a practical embodiment of the arrangement shown in FIG 1, the transistors 1 and 2 ma. of the type BC 108, while the resistors 3 and 4 each had a value of 8.2 $k\Omega$ and the resistors 5 and 6 each had a value of 3.3 $k\Omega$. When charging a miniature battery cell for use in a hearing aid, a charging current of 5.5 ma. was measured with a charging current source of 20 V., while the residual voltage $V_{ao}$ of the miniature battery by which the arrangement was still controlled in a reliable manner was 0.15 V.

In a practical embodiment of the arrangement shown in FIG. 3, the transistors 1 and 2 were of the type AC 127 and the transistors 15 and 16 of the type AC 128, while the resistors 3, 4, 17 and 18 each had a value of 1.8 $k\Omega$. Also in this embodiment, the commutation was still reliable with a battery voltage $V_{ao}$ of 0.15 to 0.2 v.

Each of the arrangements described can be equipped with a bridge rectifier through which a charging current source of arbitrary polarity, or even an alternating voltage source, is connected to the input terminals 7 and 8 so that also in this case a wrong connection of the charging current source is impossible.

I claim:

1. Apparatus for charging an electric battery comprising, a DC source of charge current, and a switching circuit for interconnecting the current source terminals with the battery terminals and arranged to effectively reverse the terminal connections therebetween in response to an improperly connected battery, said switching circuit comprising, a symmetrical bistable trigger circuit including two semiconductor amplifier elements arranged to conduct during different time intervals, each amplifier element having an output, a control and a common electrode, first and second input terminals connected to the terminals of the current source, first and second impedance elements, means individually connecting the output electrodes to said first and second input terminals via said first and second impedance elements, a pair of coupling resistors connected to cross-couple the output and control electrodes of the amplifier elements, means connecting the common electrodes to said second input terminal, and a pair of output terminals individually connected to the output electrodes and adapted for connection to said battery so that for a given battery polarity at the output terminals one amplifier provides a charge path between current source and battery and the other amplifier provides a battery discharge path, whereas for the reverse battery polarity said other amplifier provides the charge path and said one amplifier provides the discharge path, the state of said trigger circuit being controlled by the polarity of the battery voltage so as to hold the amplifier in the discharge path cutoff and to hold the amplifier in the charge path on.

2. Apparatus as claimed in claim 1 characterized in that the semiconductor amplifier elements are junction transistors, the emitters of which are connected to the second input terminal.

3. Apparatus as claimed in claim 1 further comprising first and second diodes connected in the forward direction in series with said first and second impedances, respectively.

4. Apparatus as claimed in claim 1 characterized in that the first and second impedance elements comprise the main current electrode paths of two further semiconductor amplifier elements connected so that the main current electrode paths of the four semiconductor elements form a symmetrical bridge, a second pair of coupling resistors connected to cross-coupled the output and control electrodes of said two further amplifier elements whereby alternate arms of the bridge are conducting and nonconducting, respectively.

5. Apparatus as claimed in claim 4 characterized in that the further semiconductor amplifier elements are transistors of a conductivity type which is opposite to that of the first-mentioned transistors and the emitters of which are connected to the first input terminal.

6. Apparatus as claimed in claim 3 further comprising an adjustable common resistor connected between one of the input terminals and the symmetrical bistable trigger circuit.

7. A switching device for connecting an electric battery to a DC source of charge current comprising, a bistable trigger said having first and second input terminals connected to the terminals of the current source and a pair of output terminals adapted for connection to the battery, said trigger circuit comprising first and second semiconductor amplifier elements each having an output electrode individually connected to an output terminal and a control electrode individually connected to an output terminal with the output and control electrode of each amplifier connected to a different output terminal, means connecting the common electrodes of the amplifier elements to the current source so that the current source exhibits a forward polarity with respect thereto, each of said amplifier elements alternatively providing a charge path and a discharge path for the battery as a function of the battery polarity connections to the output terminals, said trigger circuit being responsive to the battery polarity so as to change state whenever the amplifier element providing the discharge path is conductive.

8. A device as claimed in claim 7 further comprising first and second diodes individually connected in series with said first and second amplifier elements and with the same polarity.

9. A device as claimed in claim 8 further comprising first and second load impedance elements, means connecting said first impedance element in series with the first diode between the first input terminal and the output electrode of the first amplifier element, and means connecting said second impedance element in series with the second diode between said first input terminal and the output electrode of the second amplifier element.